United States Patent
Arora et al.

(10) Patent No.: US 10,216,547 B2
(45) Date of Patent: *Feb. 26, 2019

(54) HYPER-THREADED PROCESSOR ALLOCATION TO NODES IN MULTI-TENANT DISTRIBUTED SOFTWARE SYSTEMS

(71) Applicant: International Business Machines Corporation, Armonk, NY (US)

(72) Inventors: Rachit Arora, Bangalore (IN); Dharmesh K. Jain, Bangalore (IN); Padmanabhan Krishnan, Bangalore (IN); Shrinivas S. Kulkarni, Bangalore (IN); Subin Shekhar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/358,252

(22) Filed: Nov. 22, 2016

(65) Prior Publication Data

US 2018/0143863 A1    May 24, 2018

(51) Int. Cl.
*G06F 9/455* (2018.01)
*G06F 9/50* (2006.01)
(Continued)

(52) U.S. Cl.
CPC ........ *G06F 9/5077* (2013.01); *G06F 9/45558* (2013.01); *G06F 9/505* (2013.01);
(Continued)

(58) Field of Classification Search
None
See application file for complete search history.

(56) References Cited

U.S. PATENT DOCUMENTS

| 4,847,755 A | 7/1989 | Morrison et al. |
| 7,707,578 B1 * | 4/2010 | Zedlewski ............ G06F 9/5027 712/215 |

(Continued)

OTHER PUBLICATIONS

"Hyper-threading", Wikipedia, Accessed from the Internet on Aug. 24, 2016, https://en.wikipedia.org/wiki/Hyper-threading, 7 pages.

(Continued)

*Primary Examiner* — Wissam Rashid
(74) *Attorney, Agent, or Firm* — Francis Lammes; Stephen J. Walder, Jr.; Robert C. Bunker

(57) ABSTRACT

A mechanism is provided for allocating a hyper-threaded processor to nodes of multi-tenant distributed software systems. Responsive to receiving a request to provision a node of the multi-tenant distributed software system on the host data processing system, a cluster to which the node belongs is identified. Responsive to the node being a second type of node, responsive to determining that another second type of node in the same cluster has been provisioned on the host data processing system, and responsive to the number of unallocated VPs on different physical processors from that of the other second type of node being greater than or equal to the requested number of VPs for the second type of node, the requested number of VPs for the second type of node is allocated each to a different physical processor from that of the other second type of node.

10 Claims, 6 Drawing Sheets

(51) Int. Cl.
*H04L 29/08* (2006.01)
*H04L 29/06* (2006.01)

(52) U.S. Cl.
CPC ............. *H04L 67/10* (2013.01); *H04L 67/38* (2013.01); *G06F 2009/4557* (2013.01)

(56) References Cited

U.S. PATENT DOCUMENTS

| | | | |
|---|---|---|---|
| 9,323,767 B2 | 4/2016 | Blanchflower et al. | |
| 2015/0277944 A1* | 10/2015 | Wang | G06F 9/45558 718/1 |
| 2015/0355926 A1* | 12/2015 | Cropper | G06F 9/5044 718/1 |
| 2016/0004973 A1 | 1/2016 | Trenkov et al. | |
| 2016/0055120 A1 | 2/2016 | Vorbach et al. | |

OTHER PUBLICATIONS

"Optimizing Hadoop* Deployments", Intel, Cloud Computing, White Paper, Oct. 2010, 8 pages.
Wahl, Chris, "Hyper-Threading Gotcha with Virtual Machine vCPU Sizing", Wahlnetwork, Sep. 30, 2013, 19 pages.
List of IBM Patents or Patent Applications Treated as Related, Jan. 25, 2018, 2 pages.

* cited by examiner

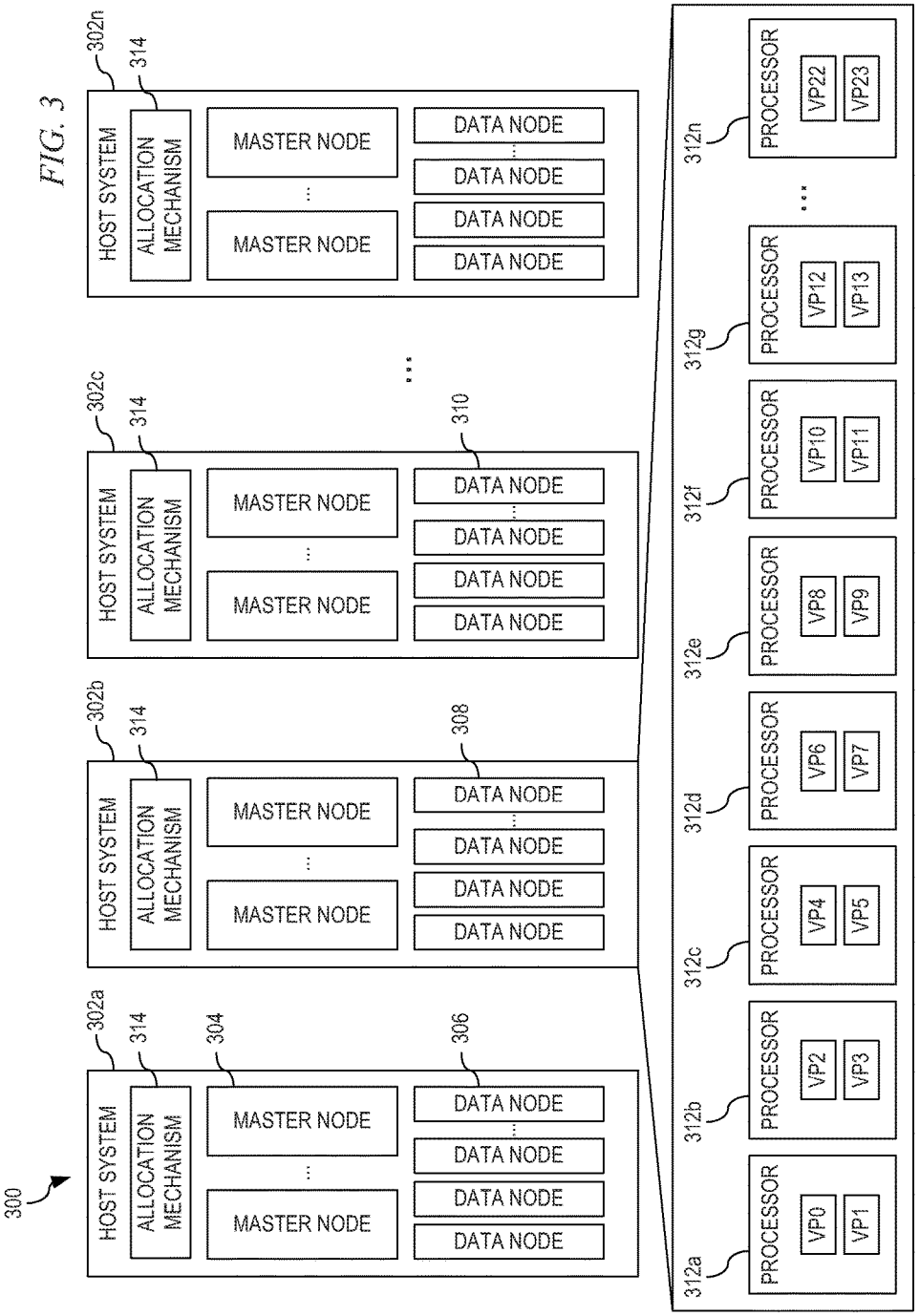

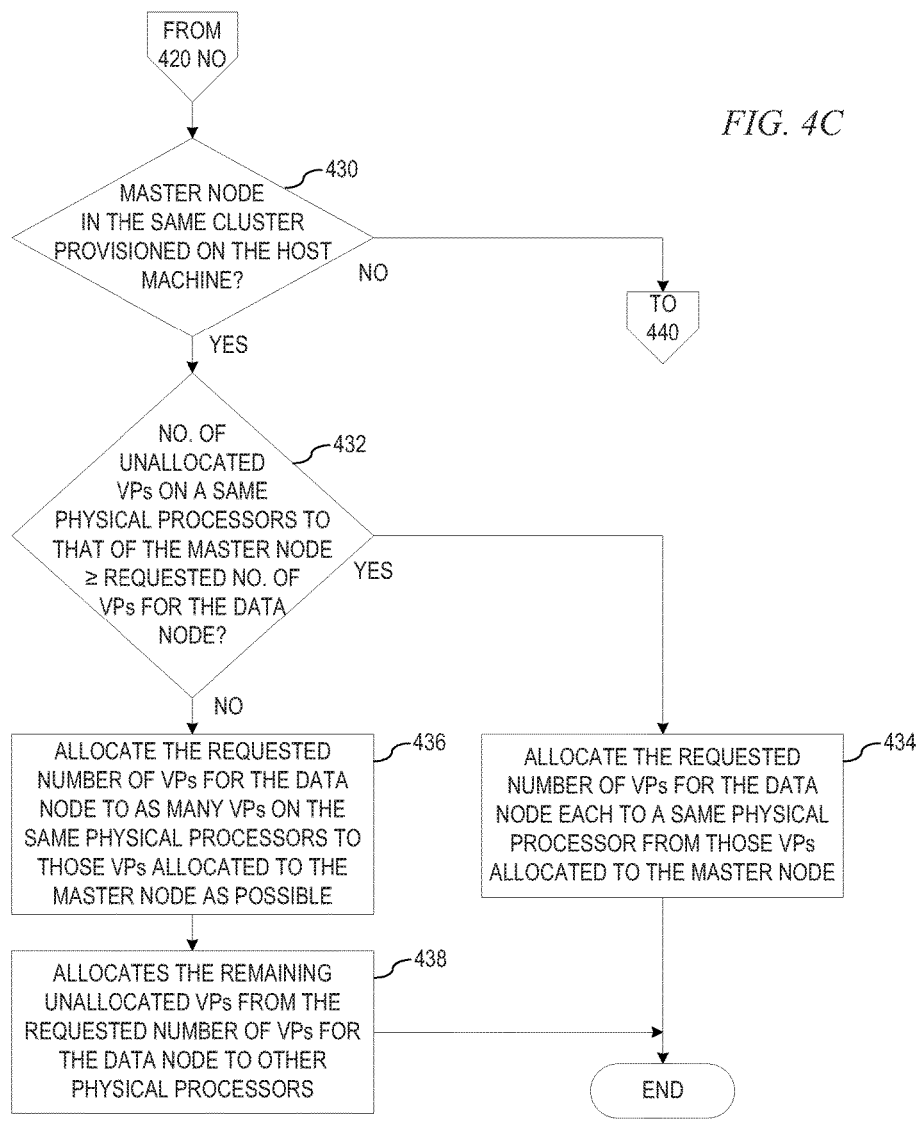

HYPER-THREADED PROCESSOR ALLOCATION TO NODES IN MULTI-TENANT DISTRIBUTED SOFTWARE SYSTEMS

BACKGROUND

The present application relates generally to an improved data processing apparatus and method and more specifically to mechanisms for smartly allocating a hyper-threaded processor to nodes of multi-tenant distributed software systems.

Distributed software systems are deployed on more than one host machine or node—each machine or node having one or more processors, memory, and (optionally) persistent storage, such as a hard disk, solid-state drive, or the like. The machines may be physical machines, virtual machines, Linux® containers or the like. The machines or nodes are connected over a network, such as a physical network, virtual network, software defined network, or the like. Hadoop is one example of such a distributed clustered software system, as the Hadoop processes are distributed over multiple machines or nodes, i.e. a cluster of machines or nodes.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for allocating a hyper-threaded processor to nodes of multi-tenant distributed software systems. The illustrative embodiment identifies a cluster to which a node belongs in response to receiving a request to provision the node of the multi-tenant distributed software system on the host data processing system. The illustrative embodiment determines whether the node is a first type of node or a second type of node. The illustrative embodiment determines whether another second type of node in the same cluster has been provisioned on the host data processing system in response to the node being the second type of node. The illustrative embodiment determines whether a number of unallocated virtual processors (VPs) on different physical processors from that of the other second type of node is greater than or equal to a requested number of VPs for the second type of node in response to determining that another second type of node in the same cluster has been provisioned on the host data processing system. The illustrative embodiment allocates the requested number of VPs for the second type of node each to a different physical processor from that of the other second type of node in response to the number of unallocated VPs on different physical processors from that of the other second type of node being greater than or equal to the requested number of VPs for the second type of node.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 depicts a functional block diagram of an allocation mechanism that smartly allocates a hyper-threaded processor to nodes of multi-tenant distributed software systems in accordance with an illustrative embodiment; and FIGS. 4A-4D depict a flowchart of the operation performed by an allocation mechanism in smartly allocating a hyper-threaded processor to nodes of multi-tenant distributed software systems in accordance with an illustrative embodiment.

DETAILED DESCRIPTION

Figure 1:
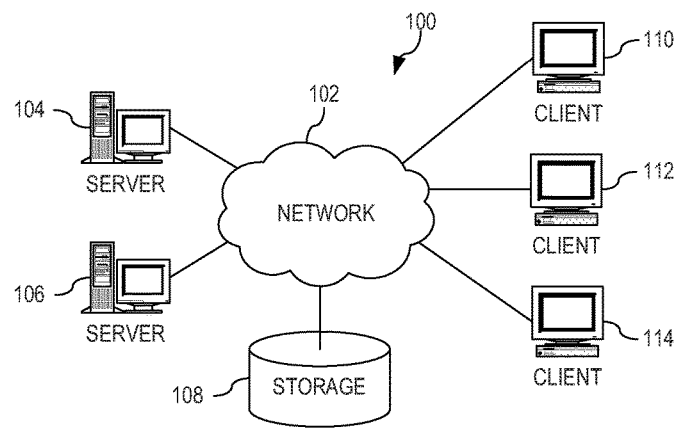
FIG. 1 is an example diagram of a distributed data processing system in which aspects of the illustrative embodiments may be implemented.

The illustrative embodiments provide mechanisms for smartly allocating a hyper-threaded processor to nodes of multi-tenant distributed software systems. The illustrative embodiments are applicable to any multi-tenant distributed software system that has characteristics, such as:

one large machine divided into multiple virtual machines (VMs) or containers or any equivalent thereof,
where a software process running in each VM or container may further split the VM into multiple sub-containers/ inner-containers or sub-processing units, such as a yarn container,
where each sub-container runs a part of the job, such as a map task or reduce task, each task or job needing one or more processors and memory,
where typically a same type of job or task is scheduled on multiple sub-containers of the outer VM or container and hence the workload characteristic and timing of using physical resources across sub-containers/inner level containers is similar thereby causing resource contention.

As noted previously, distributed software systems include multiple nodes distributed across multiple physical host machines. Distributed software systems typically have a master/slave architecture including a master node, which manages the file system namespace and regulates access to files by clients, and a set of slave nodes or data nodes that manage storage attached to the nodes that they run on, run jobs on the data attached to the data node, pull data from other nodes and then run a job, or the like. When a host machine hosts multiple different clusters, different ones of the master nodes or data nodes are spawned off as virtual machines (VMs) or containers, such as a Linux® container, a docker container, or the like. These master nodes or data nodes (VMs or containers) are allocated to a dedicated set of processors on the host machine. If the underlying host machine supports simultaneous multithreading (SMT), also referred to as hyper-threading, one physical processor may host multiple virtual processors (VPs) with one or more VPs allocated to any one node (VM or container). Thus, for a distributed software system, each master node/data node (VM or container) is allocated one or more VPs on a physical processor.

In one embodiment, When executing a Big Data job, if two VPs from a same physical processor are allocated to a node, owing to the nature of Big Data job, such an allocation may result in poor performance. Big Data is a term that describes the large volume of data—both structured and unstructured—that inundates a business on a day-to-day basis. Therefore, when a Big Data job is submitted to a cluster, one or more nodes are chosen as candidates to run the job and in each node one or more tasks are scheduled. Typically, each of these tasks has very similar characteristics in terms of processor, disk, and input/output (I/O) utilization. If the task is processor intensive, then multiple tasks assigned on a given node will most likely compete for processor utilization. That is, current VP allocation to nodes (VMs or containers) allocated VPs to nodes such that a node of a cluster may have two VPs from a same processor allocated.

However, another job scheduled on another node of another cluster sharing the same host machine will most likely have different job characteristic or different timing of resource requirement. Thus, the illustrative embodiments provide an allocation mechanism that smartly allocates a hyper-threaded processor to nodes of multi-tenant distributed software systems. Hyper-threading was built with the assumption that not all VPs will be operated simultaneously thus, leveraging short gaps between work to be done by different VPs, the physical processor smartly shares time between two VPs shared by same physical processor. Hence, in hyper-threaded systems, by allocating VPs from different physical processors to each node (VM or container) the allocation mechanisms ensure that multiple simultaneous tasks running on a node of a cluster do not compete for a same physical processor.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
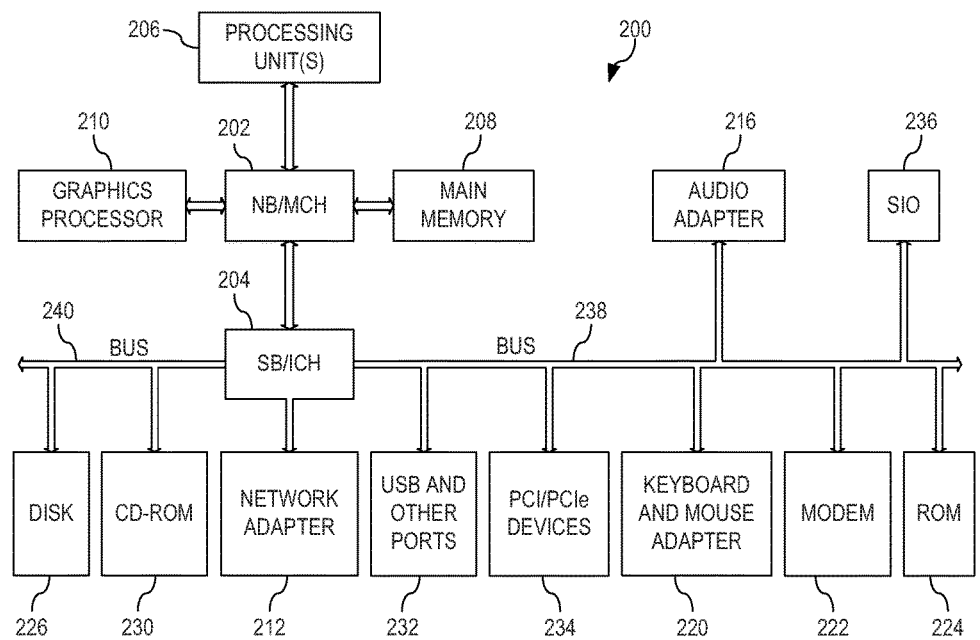
FIG. 2 is an example block diagram of a computing device in which aspects of the illustrative embodiments may be implemented.
Figure 4A:
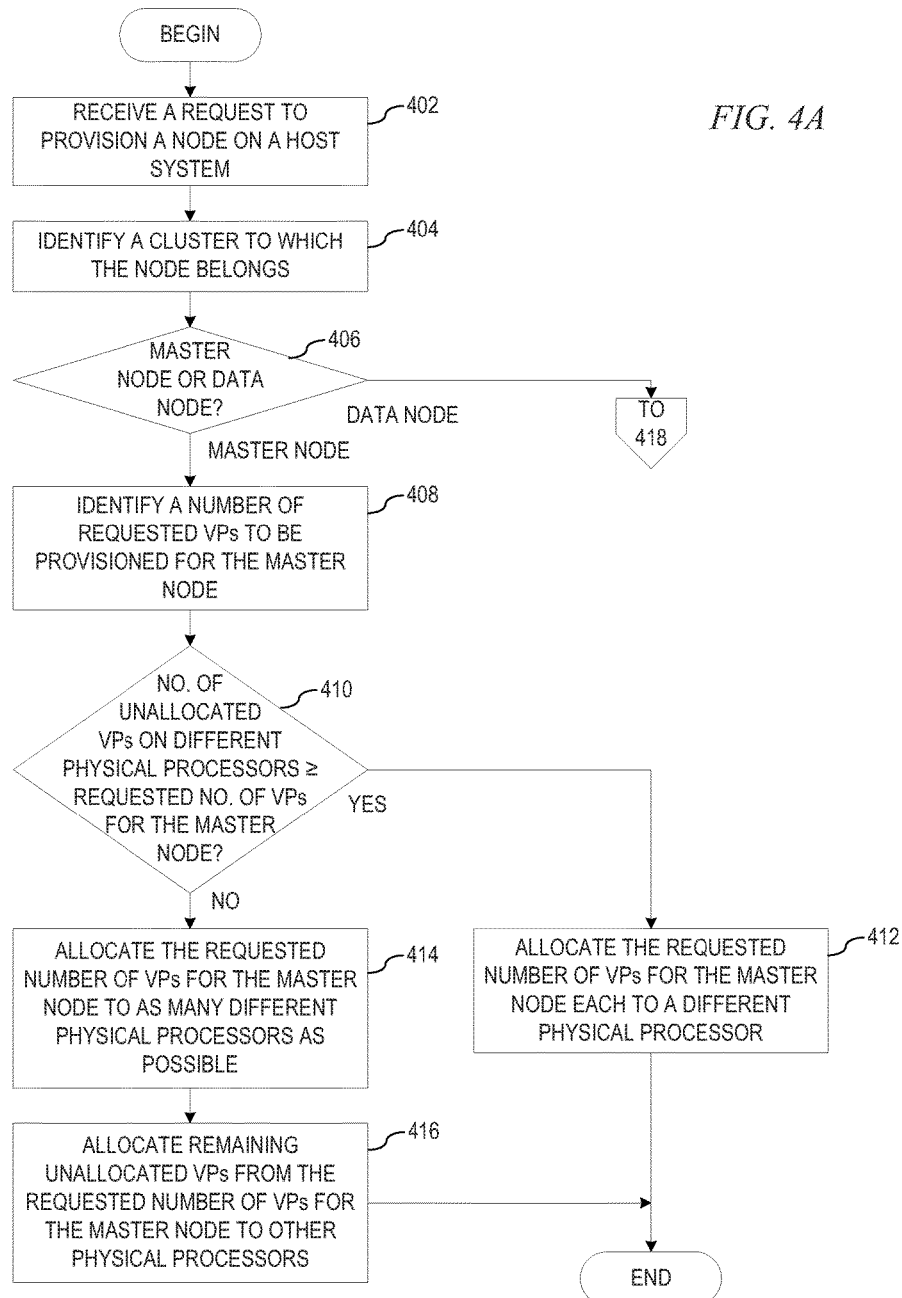
Figure 4B:
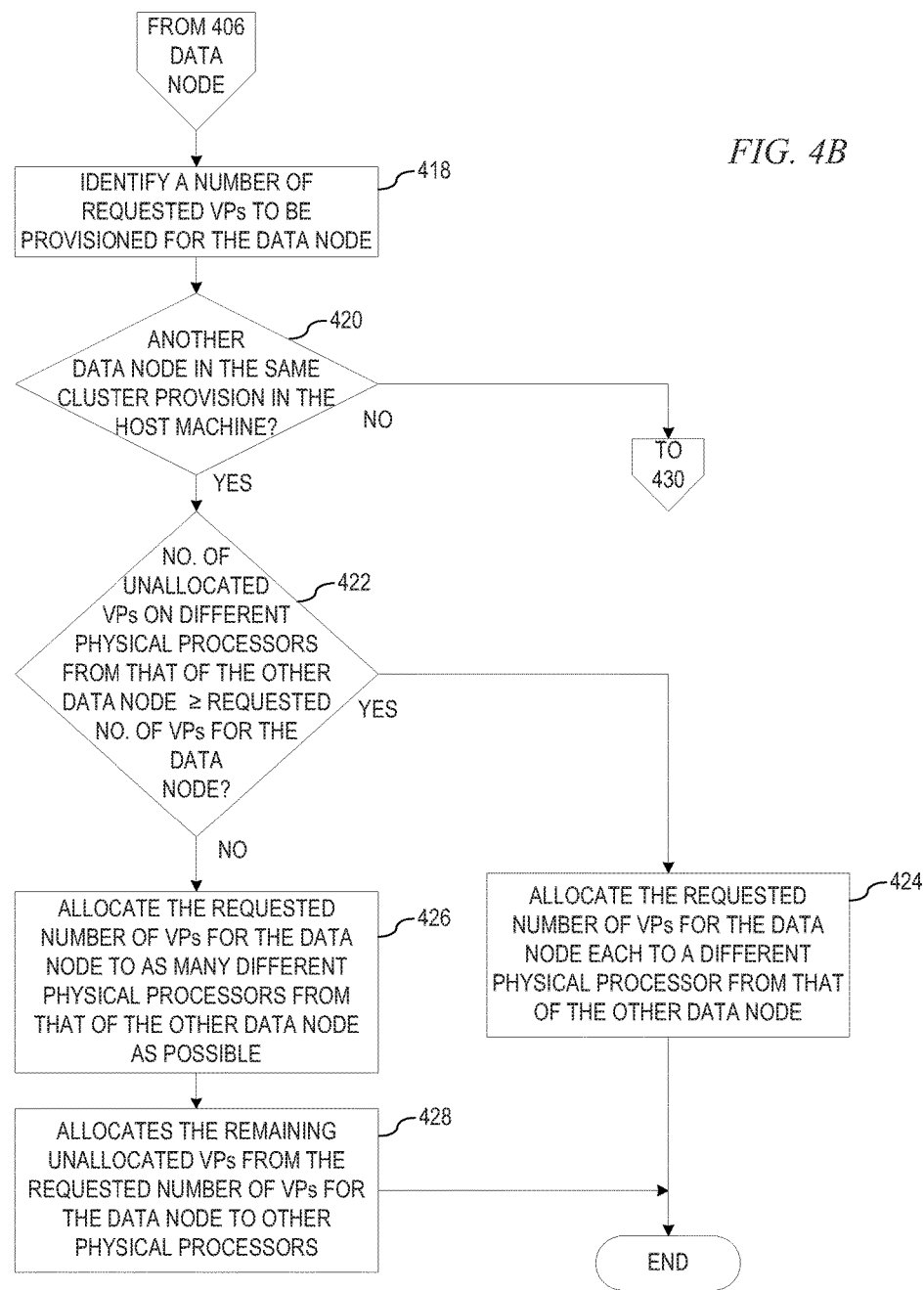
Figure 4D:
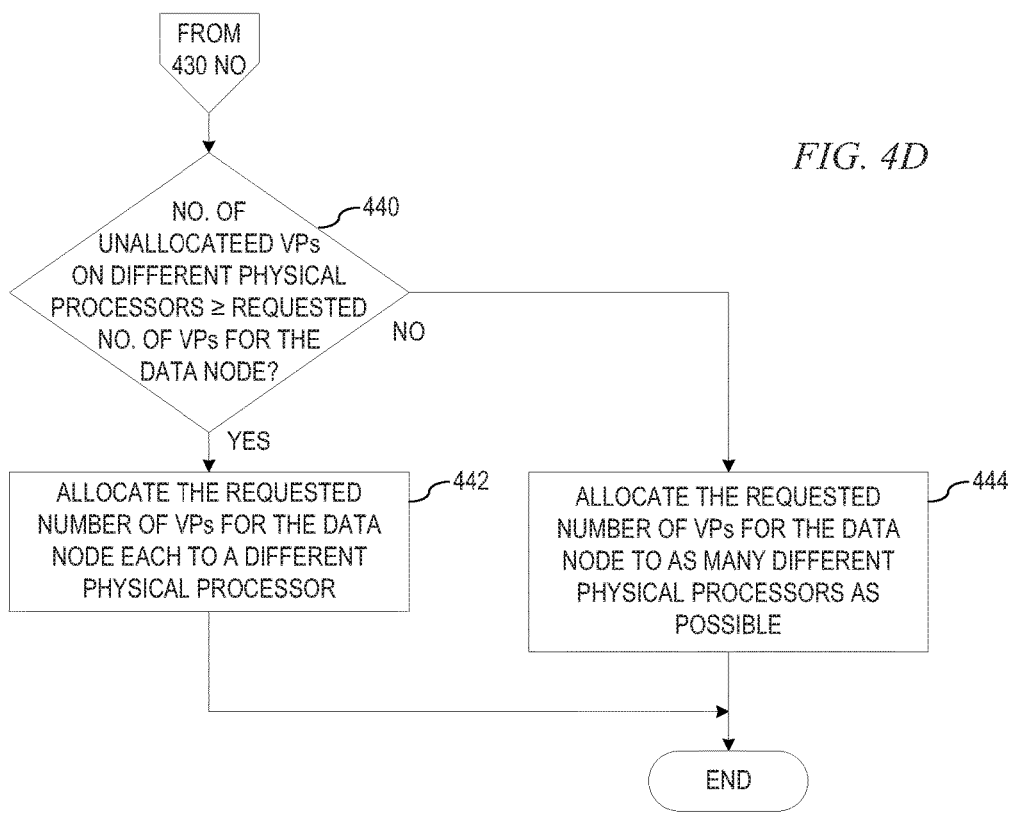

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an allocation mechanism that smartly allocates a hyper-threaded processor to nodes of multi-tenant distributed software systems. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates smartly allocating a hyper-threaded processor to nodes of multi-tenant distributed software systems.

As noted above, the mechanisms of the illustrative embodiments utilize specifically configured computing devices, or data processing systems, to perform the operations for smartly allocating a hyper-threaded processor to nodes of multi-tenant distributed software systems. These computing devices, or data processing systems, may comprise various hardware elements, which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the smartly allocating a hyper-threaded processor to nodes of multi-tenant distributed software systems.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 depicts a functional block diagram of an allocation mechanism that smartly allocates a hyper-threaded processor to nodes of multi-tenant distributed software systems in accordance with an illustrative embodiment. Data processing system 300, which is a data processing system such as data processing system 100 of FIG. 1, comprises a set of host machines 302a, 302b, 302c, ..., 302n that form a shared infrastructure on which multiple distributed software systems reside. Each distributed software system comprises one master node and multiple data nodes, which may reside on one host machine, such as host machine 302a, or, typically, across multiple host machines, such that, for example, for a particular distributed software system that comprises master node and three data nodes, master node 304 resides on host machine 302a and the data nodes 306, 308 and 310 reside on host machines 302a, 302b, and 302c. Each of the master nodes and data nodes are a virtual machine (VM) or a container, such as Linux® container, a docker container, or the like, although other implementations are possible without departing from the spirit and scope of the present invention.

In the depicted example, each of host machines 302a, 302b, 302c, ..., 302n include multiple physical processors 312a, 312b, 312c, ..., 312n, which, if the underlying host machine supports simultaneous multithreading (SMT), also referred to as hyper-threading, as is the case in these illustrative embodiment, each of physical processors 312a, 312b, 312c, ..., 312n, host multiple virtual processors (VPs). In this example, each of physical processors 312a, 312b, 312c, ..., 312n comprise two VPs, although it is recognized that a physical processor may host more than two VPs each without departing from the spirit and scope of the invention. In furtherance to this example, each of host machines 302a, 302b, 302c, ..., 302n comprises twelve processors and, when hyper-threading is turned on, each of host machines 302a, 302b, 302c, ..., 302n would have 24 VPs, labeled VP0-VP23.

As noted previously, current allocation of VP to nodes is done in a manner such that current VP allocation to nodes (VMs or containers) allocates VPs to nodes such that a particular node of a cluster may be have VPs allocated to a same physical processor. For example, using current allocation implementations, node X of cluster XX is allocated VP0, VP1, VP2, and VP3 and node Y of cluster YY is allocated VP4, VP5, VP6, and VP7. In this example, when a job is submitted to cluster XX, four tasks are assigned to node X and each of the four tasks is highly processor intensive. If the nodes within cluster XX are configured in the configuration exemplified above, i.e. node X is allocated VP0, VP1, VP2, and VP3, then each of the four tasks will be assigned to a specific one of VP0, VP1, VP2, and VP3. For example, task 1 to VP0, task 2 to VP1, task 3 to VP2, and task 4 to VP3. Since each task is processor intensive, each task requires a full slice of the processor. However, since VP0 and VP1 belong to physical processor 312a, a switching occurs between tasks 1 and 2, thereby affecting the overall performance. It should be noted that while all the VPs of cluster X are busy, the VPs of cluster Y, i.e. VP4, VP5, VP6, and VP7, might not be performing any tasks or less processor intensive tasks, thereby not using two full physical processors.

In accordance with the illustrative embodiments, allocation mechanism 314 within each of host machines 302a, 302b, 302c, ..., 302n allocates VPs to nodes such that any VPs allocated to node(s) of a same cluster are allocated from different physical processors 312a, 312b, 312c, ..., 312n. Thus, when a node is to be provisioned on the particular host machine, allocation mechanism 314 identifies the cluster to which the node belongs. Allocation mechanism 314 then determines whether the node to be provisioned is a master node or a data node. If allocation mechanism 314 determines that the node to be provisioned is a master node, then allocation mechanism 314 allocates the requested number of VPs for the master node each to a different physical processor if possible, otherwise to as many different physical processors as possible. If allocation mechanism 314 determines that the node to be provisioned is a data node, then allocation mechanism 314 determines whether another data node in the same cluster has been provisioned on the host machine. If allocation mechanism 314 determines that another data node in the same cluster has been provisioned, then allocation mechanism 314 allocates the requested number of VPs to the data node each to a different physical processor from those VPs allocated to the other data node if possible, otherwise to as many different physical processors from those VPs allocated to the other data node as possible.

If allocation mechanism 314 determines that another data node in the same cluster fails to have been provisioned, then allocation mechanism 314 determines whether a master node in the same cluster has been provisioned on the host machine. If allocation mechanism 314 determines that a master node in the same cluster is provisioned on the host machine, allocation mechanism 314 allocates the requested number of VPs for the data node each to a same physical processor from those VPs allocated to the master node if possible, otherwise to as many of the same physical processors to those VPs allocated to the master node as possible. If allocation mechanism 314 determines that a master node in the same cluster fails to be provisioned on the host machine, then allocation mechanism 314 allocates the requested number of VPs for the data node each to a different physical processor if possible, otherwise to as many different physical processors as possible.

Accordingly, using the previous example, allocation mechanism 314 would allocate VP0, VP2, VP4, and VP6 to node X of cluster XX and VP1, VP3, VP5 and VP7 to node Y of cluster YY. Thus, when a job is submitted to cluster XX, four tasks are assigned to node X and each of the four tasks is highly processor intensive. If the nodes within cluster XX are configured in accordance with the illustrative embodiments, then each of the four tasks will be assigned to a specific one of VP0, VP2, VP4, and VP6. Since each task is processor intensive, each task requires a full slice of the processor, no switching occurs between tasks, and overall performance is not affected.

With regard to assigning data nodes to the same physical processor as master nodes, since tasks are mostly assigned to data nodes and thus VPs allocated to master node perform little processor intensive work, if, during data node provisioning, allocation mechanism 314 determines that a master node in the same cluster is provisioned on the host machine, allocation mechanism 314 may allocate the requested number of VPs for the data node each to a same physical processor to those VPs allocated to the master node if possible, otherwise to as many of the same physical processors to those VPs allocated to the master node as possible. Thus, for example, allocation mechanism 314 may provision VP0, VP2, VP4, VP6, VP8, VP10, VP12, and VP14 to a master node MX of cluster XX; VP1, VP3, VP5, and VP7 to data node X of cluster node XX; and VP9, VP11, VP13, and VP15 to data node Y of cluster node YY. In yet another embodiment, allocation mechanism 314 may reserve all even number VPs for master nodes and all odd number VPs for data nodes or vice versa.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIGS. 4A-4D depict a flowchart of the operation performed by an allocation mechanism in smartly allocating a hyper-threaded processor to nodes of multi-tenant distributed software systems in accordance with an illustrative embodiment. As the operation begins, the allocation mechanism receives a request to provision a node on a host system in which the allocation mechanism resides (step 402). The allocation mechanism identifies a cluster to which the node belongs (step 404). The allocation mechanism determines whether the node to be provisioned is a master node or a data node (step 406). If at step 406 the allocation mechanism determines that the node to be provisioned is a master node, the allocation mechanism identifies a number of requested VPs to be provisioned for the master node (step 408). The allocation mechanism then determines whether a number of unallocated VPs on different physical processors is greater than or equal to the requested number of VPs for the master node (step 410). If at step 410 the number of unallocated VPs on different physical processors is greater than or equal to the requested number of VPs for the master node, the allocation mechanism allocates the requested number of VPs for the master node each to a different physical processor (step 412), with the operation ending thereafter. If at step 410 the number of unallocated VPs on different physical processors is less than the requested number of VPs for the master node, the allocation mechanism allocates the requested number of VPs for the master node to as many different physical processors as possible (step 414) and allocates the remaining unallocated VPs from the requested number of VPs for the master node to other physical processors (step 416), with the operation ending thereafter.

If at step 406 the allocation mechanism determines that the node to be provisioned is a data node, identifies a number of requested VPs to be provisioned for the data node (step 418). The allocation mechanism then determines whether another data node in the same cluster has been provisioned on the host machine (step 420). If at step 420 the allocation mechanism determines that another data node in the same cluster has been provisioned, allocation mechanism determines whether a number of unallocated VPs on different physical processors from that of the other data node is greater than or equal to the requested number of VPs for the data node (step 422). If at step 422 the number of unallocated VPs on different physical processors from that of the other data node is greater than or equal to the requested number of VPs for the data node, the allocation mechanism allocates the requested number of VPs for the data node each to a different physical processor from that of the other data node (step 424), with the operation ending thereafter. If at step 422 the number of unallocated VPs on different physical processors from that of the other data node is less than the requested number of VPs for the data node, the allocation mechanism allocates the requested number of VPs for the data node to as many different physical processors from that of the other data node as possible (step 426) and allocates the remaining unallocated VPs from the requested number of VPs for the data node to other physical processors (step 428), with the operation ending thereafter.

If at step 420 the allocation mechanism determines that no other data node in the same cluster has been provisioned, the allocation mechanism determines whether a master node in the same cluster has been provisioned on the host machine (step 430). If at step 430 the allocation mechanism determines that a master node in the same cluster is provisioned on the host machine, the allocation mechanism determines whether a number of unallocated VPs on the same physical processors to that of the master node is greater than or equal to the requested number of VPs for the data node (step 432). If at step 432 the number of unallocated VPs on the same physical processors to that of the master node is greater than or equal to the requested number of VPs for the data node, the allocation mechanism allocates the requested number of VPs for the data node each to a same physical processor from those VPs allocated to the master node (step 434), with the operation ending thereafter. If at step 432 the number of unallocated VPs on the same physical processors to that of the master is less than the requested number of VPs for the data node, the allocation mechanism allocates the requested number of VPs for the data node to as many VPs on the same physical processors to those VPs allocated to the master node as possible (436) and allocates the remaining unallocated VPs from the requested number of VPs for the data node to other physical processors (step 438), with the operation ending thereafter.

If at step 430 the allocation mechanism determines that a master node in the same cluster fails to be provisioned on the host machine, the allocation mechanism determines whether a number of unallocated VPs on different physical processors is greater than or equal to the requested number of VPs for the data node (step 440). If at step 440 the number of unallocated VPs on different physical processors is greater than or equal to the requested number of VPs for the data node, the allocation mechanism allocates the requested number of VPs for the data node each to a different physical processor (step 442), with the operation ending thereafter. If at step 440 the number of unallocated VPs on different physical processors is less than the requested number of VPs for the data node, the allocation mechanism allocates the requested number of VPs for the data node to as many different physical processors as possible (step 444), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for smartly allocates a hyper-threaded processor to nodes of multi-tenant distributed software systems. Hyper-threading was built with the assumption that not all VPs will be operated simultaneously thus, leveraging short gaps between work to be done by different VPs, the physical processor smartly shares time between two VPs shared by same physical processor. Hence in hyper-threaded systems, by allocating VPs from different physical processors to each node (VM or container) the allocation mechanisms ensure that multiple simultaneous tasks running on a node of a cluster do not compete for a same physical processor.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having a computer readable program for allocating a hyper-threaded processor to nodes of multi-tenant distributed software systems stored therein, wherein the computer readable program, when executed on a computing device, causes the computing device to:

responsive to receiving a request to provision a node of the multi-tenant distributed software system on the host data processing system, identify a cluster of nodes to which the node belongs;

determine whether the node is a first type of node or a second type of node;

responsive to the node being the second type of node, determine whether another second type of node in the same cluster has been provisioned on the host data processing system;

responsive to determining that another second type of node in the same cluster has been provisioned on the host data processing system, determine whether a number of unallocated virtual processors (VPs) on different physical processors from that of the other second type of node is greater than or equal to a requested number of VPs for the second type of node;

responsive to the number of unallocated VPs on different physical processors from that of the other second type of node being greater than or equal to the requested number of VPs for the second type of node, allocate the requested number of VPs for the second type of node each to a different physical processor from that of the other second type of node; and responsive to the number of unallocated VPs on different physical processors from that of the other second type of node being less than the requested number of VPs for the second type of node, allocate up to the requested number of VPs for the second type of node to as many different physical processors as supported by the different physical processors from that of the other second type of node; and allocate any remaining unallocated VPs from the requested number of VPs for the second type of node to other physical processors.

2. The computer program product of claim 1, wherein the computer readable program further causes the computing device to:

responsive to determining that another second type of node in the same cluster fails to be provisioned on the host data processing system, determine whether a first type of node in the same cluster has been provisioned on the host data processing system;

responsive to the determining that the first type of node in the same cluster has been provisioned on the host data processing system, determine whether a number of unallocated VPs on the same physical processors to that of the first type of node is greater than or equal to the requested number of VPs for the second type of node; and responsive to the number of unallocated VPs on the same physical processors to that of the first type of node being greater than or equal to the requested number of VPs for the second type of node, allocate the requested number of VPs for the second type of node each to a same physical processor from those VPs allocated to the first type of node.

3. The computer program product of claim 2, wherein the computer readable program further causes the computing device to:

responsive to the number of unallocated VPs on the same physical processors to that of the first type of node being less than the requested number of VPs for the second type of node, allocate as many of the requested number of VPs for the second type of node to the same physical processors of those VPs allocated to the first type of node as possible; and allocate any remaining unallocated VPs from the requested number of VPs for the second type of node to other physical processors.

4. The computer program product of claim 2, wherein the computer readable program further causes the computing device to:

responsive to the determining that the first type of node in the same cluster fails to be provisioned on the host data processing system, determine whether a number of unallocated VPs on different physical processors is greater than or equal to the requested number of VPs for the second type of node;

responsive to the number of unallocated VPs on different physical processors being greater than or equal to the requested number of VPs for the second type of node, allocate the requested number of VPs for the da second type of ta node each to a different physical processor, and responsive to the number of unallocated VPs on different physical processors being less than the requested number of VPs for the second type of node, allocate the requested number of VP for the second type of node to as many different physical processors as possible.

5. The computer program product of claim 1, wherein the computer readable program further causes the computing device to:

responsive to the node being the first type of node, determine whether a number of unallocated VPs on different physical processors is greater than or equal to a requested number of VPs for the first type of node;

responsive to the number of unallocated VPs on different physical processors being greater than or equal to the requested number of VPs for the first type of node, allocate the requested number of VPs for the first type of node each to a different physical processor; and responsive to the number of unallocated VPs on different physical processors being less than the requested number of VPs for the first type of node:

allocate the requested number of VPs for the first type of node to as many different physical processors as possible; and allocate any remaining unallocated VPs from the requested number of VPs for the first type of node to other physical processors.

6. An apparatus for allocating a hyper-threaded processor to nodes of multi-tenant distributed software systems comprising:

a processor; and a memory coupled to the processor, wherein the memory comprises instructions which, when executed by the processor, cause the processor to:

responsive to receiving a request to provision a node of the multi-tenant distributed software system on the host data processing system, identify a cluster of nodes to which the node belongs;

determine whether the node is a first type of node or a second type of node;

responsive to the node being the second type of node, determine whether another second type of node in the same cluster has been provisioned on the host data processing system;

responsive to determining that another second type of node in the same cluster has been provisioned on the host data processing system, determine whether a number of unallocated virtual processors (VPs) on different physical processors from that of the other second type of node is greater than or equal to a requested number of VPs for the second type of node;

responsive to the number of unallocated VPs on different physical processors from that of the other second type of node being greater than or equal to the requested number of VPs for the second type of node, allocate the requested number of VPs for the second type of node each to a different physical processor from that of the other second type of node;

responsive to the number of unallocated VPs on different physical processors from that of the other second type of node being less than the requested number of VPs for the second type of node, allocate up to the requested number of VPs for the second type of node to as many different physical processors as supported by the different physical processors from that of the other second type of node; and allocate any remaining unallocated VPs from the requested number of VPs for the second type of node to other physical processors.

7. The apparatus of claim 6, wherein the instructions further cause the processor to:

responsive to determining that another second type of node in the same cluster fails to be provisioned on the host data processing system, determine whether a first type of node in the same duster has been provisioned on the host data processing system;

responsive to the determining that the first type of node in the same cluster has been provisioned on the host data processing system, determine whether a number of unallocated VPs on the same physical processors to that of the first type of node is greater than or equal to the requested number of VPs for the second type of node; and responsive to the number of unallocated VPs on the same physical processors to that of the first type of node being greater than or equal to the requested number of VPs for the second type of node, allocate the requested number of VPs for the second type of node each to a same physical processor from those VPs allocated to the first type of node.

8. The apparatus of claim 7, wherein the instructions further cause the processor to:

responsive to the number of unallocated VPs on the same physical processors to that of the first type of node being less than the requested number of VPs for the second type of node, allocate as many of the requested number of VPs for the second type of node to the same physical processors of those VPs allocated to the first type of node as possible; and allocate any remaining unallocated VPs from the requested number of VPs for the second type of node to other physical processors.

9. The apparatus product of claim 7, wherein the instructions further cause the processor to:

responsive to the determining that the first type of node in the same cluster fails to be provisioned on the host data processing system, determine whether a number of unallocated VPs on different physical processors is greater than or equal to the requested number of VPs for the second type of node;

responsive to the number of unallocated VPs on different physical processors being greater than or equal to the requested number of VPs for the second type of node, allocate the requested number of VPs for the da second type of ta node each to a different physical processor; and responsive to the number of unallocated VPs on different physical processors being less than the requested number of VPs for the second type of node, allocate the requested number of VP for the second type of node to as many different physical processors as possible.

10. The apparatus of claim 6, wherein the instructions further cause the processor to:

responsive to the node being the first type of node, determine whether a number of unallocated VPs on different physical processors is greater than or equal to a requested number of VPs for the first type of node;

responsive to the number of unallocated VPs on different physical processors being greater than or equal to the requested number of VPs for the first type of node, allocate the requested number of VPs for the first type of node each to a different physical processor; and responsive to the number of unallocated VPs on different physical processors being less than the requested number of VPs for the first type of node:

allocate the requested number of VPs for the first type of node to as many different physical processors as possible; and allocate any remaining unallocated VPs from the requested number of VPs for the first type of node to other physical processors.

\* \* \* \* \*